(12) United States Patent
Wurtele (10) Patent No.: US 7,049,707 B2
(45) Date of Patent: May 23, 2006

(54) AUXILIARY POWER UNIT FOR A DIESEL POWERED TRANSPORT VEHICLE

(75) Inventor: Roger N. Wurtele, Plano, TX (US)

(73) Assignee: Energy & Engine Technology Corporation, Plano, TX (US)

( * ) Notice: Subject to any disclaimer, the term of this patent is extended or adjusted under 35 U.S.C. 154(b) by 23 days.

(21) Appl. No.: 10/718,182

(22) Filed: Nov. 20, 2003

(65) Prior Publication Data

US 2004/0104578 A1 Jun. 3, 2004

Related U.S. Application Data

(60) Provisional application No. 60/427,748, filed on Nov. 21, 2002, provisional application No. 60/434,126, filed on Dec. 18, 2002, provisional application No. 60/434,129, filed on Dec. 18, 2002, provisional application No. 60/456,488, filed on Mar. 24, 2003.

(51) Int. Cl.
  *H02K 9/06* (2006.01)
(52) U.S. Cl. ................ 290/1 B; 290/1 A; 290/1 R; 290/40 A; 290/2
(58) Field of Classification Search ............ 290/40, 290/1 A, 1 R, 1 B, 2
  See application file for complete search history.

(56) References Cited

U.S. PATENT DOCUMENTS

| | | | |
|---|---|---|---|
| 4,117,342 A | 9/1978 | Melley, Jr. | 290/1 |
| 4,136,432 A | 1/1979 | Melley, Jr. | 29/469 |
| 4,448,157 A | 5/1984 | Eckstein | 123/142.5 |
| 4,531,379 A | 7/1985 | Diefenthaler, Jr. | 62/236 |
| 4,611,466 A | 9/1986 | Keedy | 60/714 |

(Continued)

FOREIGN PATENT DOCUMENTS

WO  WO 2004/048196 A2  6/1924

OTHER PUBLICATIONS

Product literature and article "If you Hate Idling, You Will Love Our System", provided by TruckGen & Air Services, Inc., Jacksonville, FL 32254 at The Great American Trucking Show, Sep. 26, 2003, Dallas, TX; 9 pages.

(Continued)

*Primary Examiner*—Darren Schuberg
*Assistant Examiner*—Iraj A. Mohandesi
(74) *Attorney, Agent, or Firm*—King & Spalding LLP (57) ABSTRACT

There is disclosed an auxiliary power unit (APU) for a transport vehicle powered by an internal combustion engine. An enclosure houses and supports the APU on the transport vehicle. An air-cooled engine within the enclosure directly drives an air-cooled, brushless generator. The generator provides direct, simultaneous AC and DC voltage outputs without requiring an inverter circuit or a converter circuit. Air duct systems within the enclosure separately convey cooling air into, through and out of the air-cooled engine and generator. The cooling air, drawn into the air duct systems by respective direct drive fan means integrated in the air-cooled engine and generator, exits through respective air outlet ducts from the enclosure.

In another embodiment, a system is disclosed comprising a compact, AC operated auxiliary heating and air conditioning unit operable in the cabin of a transport vehicle and powered by the APU described above. The system includes control means coupled to the auxiliary heating and air conditioning unit and the APU, and harness means for coupling the auxiliary heating and air conditioning unit, the APU, and the control means together.

32 Claims, 6 Drawing Sheets

U.S. PATENT DOCUMENTS

| | | | |
|---|---|---|---|
| 4,672,296 A | 6/1987 | Griffin | 322/1 |
| 4,682,649 A | 7/1987 | Greer | 165/43 |
| 4,756,359 A | 7/1988 | Greer | 165/43 |
| 4,762,170 A | 8/1988 | Nijjar et al. | 165/43 |
| 4,831,277 A * | 5/1989 | Christopher | 290/1 A |
| 4,992,669 A | 2/1991 | Parmley | 290/1 |
| RE33,687 E | 9/1991 | Greer | 165/43 |
| 5,333,678 A | 8/1994 | Mellum et al. | 165/42 |
| 5,528,901 A | 6/1996 | Willis | 60/626 |
| 5,765,805 A | 6/1998 | Kennedy | 248/674 |
| 5,899,174 A * | 5/1999 | Anderson et al. | 123/2 |
| 6,047,942 A | 4/2000 | Kennedy | 248/674 |
| 6,410,992 B1 | 6/2002 | Wall | 290/52 |
| 2002/0056993 A1 | 5/2002 | Kennedy | 290/1 |
| 2003/0070849 A1 | 4/2003 | Whittaker | 180/68.2 |

OTHER PUBLICATIONS

Product Literature "Show Idling Your Profits Away", provided by Pony Pack, Inc., Albuquerque, NM 87120 at The Great American Trucking Show, Sep. 26, 2003, Dallas, TX; 4 pages.

Product Literature "Auxiliary Power & Climate Control," copyright 2003, provided by Teleflex Canada, BC Canada V6V IP6 at The Great American Trucking Show, Sep. 26, 2003, Dallas, TX; 8 pages.

Product Literature, "Mobile Diesel Gensets for Trucks, RV, Construction & Home Use, "undated, provided by BMZ Generators and Welders, Inc., Pompano Beach, FL 33062; 1 page.

Product Literature, "Is Cooling and Heating Your Big Rig Cutting Into Your Profits," and descriptions for various auxiliary power units, generator systems and under bunk AC/Heat units, obtained Sep. 29, 2003 at www.scsfrigette.com; 10 pages.

Product Literature on portable and marine generatore sets obtianed Oct. 24 and Nov. 21, 2003, at www.bmzgenerators.com; 2 pages.

Article "The Nite No-Idle Solution," produced by Bergrstrom, Inc., Rockford, IL 61125 and published in the 2003 Product,Services and Entertainment Guide by Cornett Publishing, Inc. d/b/a America Trucking on the Road, Pelham, AL 35124, and distributed at The Great American Trucking Show, Sep. 26, 2003, Dallas, TX; 1 page.

Article reprint "Turn Idle Time Into Cash," from Sep., 2003 issue of Fleet Owner, published by PRIMEDIA Business Magazines & Media, Inc.; 16 pages.

* cited by examiner

AUXILIARY POWER UNIT FOR A DIESEL POWERED TRANSPORT VEHICLE

CROSS REFERENCE TO RELATED APPLICATIONS

This application claims priority from the following earlier filed provisional applications; Ser. No. 60/427,748, filed Nov. 21, 2002, and entitled "Environmental Power System for Long Haul Trucks;"; Ser. No. 60/434,126, filed Dec. 18, 2002, and entitled "Adjustable Carriage Mounting System for Environmental Power System for Long Haul Trucks;" Ser. No. 60/434,129, filed Dec. 18, 2002, and entitled "Flow Through Engine Exhaust System for Environmental Power System for Long Haul Trucks;" and Ser. No. 60/456,488, filed Mar. 24, 2003, and entitled "Custom Design Lid Assembly for Environmental Power Systems for Long Haul Trucks."

BACKGROUND OF THE INVENTION

1. Field of the Invention

The present invention generally relates to auxiliary power units and, more particularly, to auxiliary power units for use on transport vehicles powered by internal combustion engines to provide electrical power during periods when the transport vehicle's main engine must be shut off.

2. Description of the Prior Art

Approximately one-half million diesel-powered trucks provide long-haul transport of goods throughout the United States. A common practice among truckers is to leave the diesel engines that power these trucks running—i.e., idling—during overnight stops. This practice occurs for a number of reasons, such as (1) to keep the cab and/or the sleeper compartment warm or cool; (2) to keep the diesel fuel warm during the winter months; (3) to keep the engine warm to avoid cold starting problems; (4) to mask other noises; (5) to enable use of various electrical devices in the truck cab, and the like. Idling these large engines burns significant amounts of fuel, far in excess of the amount needed to provide power for these benefits to the drivers. Such diesel fuel consumption needlessly consumes a non-renewable energy resource, burdens the costs of shipping goods with unnecessary expense, and results in significant amounts of air and noise pollution. Idling the engines of these transport vehicles for substantial periods of time also violate various federal, state and local laws and regulations. In addition to the costs of the wasted fuel and the environmental impacts of overnight idling are the higher maintenance costs due the excess wear that results from running the engines for uses other than pulling a loaded trailer and increased health costs to treat illnesses caused by the emissions from the engines.

A number of solutions to the idling problem have been developed and are currently in use. These conventional systems generally employ an auxiliary power unit (APU) that runs on diesel fuel and drives an electric alternator or generator to supply operating voltages for heating and cooling the cab and/or sleeper compartment ("cabin") or recharging the truck battery. However, each of these conventional systems has one or more of the following disadvantages: (1) the engine of the APU is water cooled and must be tied into the radiator system of the truck or be provided with its own radiator, hoses, water pump, etc.; (2) the engine of the APU drives the alternator or generator via a belt drive, which is associated with reduced efficiency, reliability, and additional maintenance costs; (3) the APU mechanically drives the A/C compressor for an auxiliary cooling system located in the cabin of the truck; (4) the alternator or generator in the APU requires an inverter or converter to provide a second output voltage in addition to the one it produces; (5) the APU requires extensive integration into the truck fuel, cooling, exhaust and electrical systems, which increases the cost of installing and maintaining the APU and reduces the reliability of the combined systems; (6) the integration of the APU into the truck systems increases the mechanical complexity thereof resulting in reduced reliability; and (7) the APU itself tends to be heavier and less efficient than it could be using modern technology.

As an illustration, conventional auxiliary power units are typically liquid cooled and require a radiator, a water pump, hoses, thermostat, etc., along with the mechanical structure to support them. Conventional auxiliary power units also use some form of adapter that employs a belt, chain, clutch or gear set to couple the engine to the generator, which adds weight, mechanical complexity and additional maintenance requirements. Further, conventional auxiliary power units typically require a converter circuit to produce a DC voltage from the generated AC voltage output or an inverter circuit to produce an AC voltage from the generated DC voltage output. In either case, the additional circuitry adds weight, complexity, maintenance requirements and cost, all without improving the conversion efficiency of the auxiliary power unit. Efficiency is reduced in any of these conventional auxiliary power units because the motive power supplied by the engine must be large enough to overcome the extra losses associated with the more complex conventional auxiliary power units.

What is needed is an efficient, compact APU of minimal complexity that overcomes the above disadvantages, is easily integrated into an existing installation with an auxiliary heating and cooling unit, and directly and efficiently provides both AC and DC electrical power for the cabin and for battery recharging at minimum cost.

SUMMARY OF THE INVENTION

Accordingly, there is disclosed a high efficiency auxiliary power unit (APU) for a transport vehicle powered by an internal combustion engine. The APU comprises an air-cooled engine that uses the fuel supply and the engine exhaust system of the transport vehicle and has an integral, forced-air cooling system. An air-cooled, brushless generator, having an integral, forced-air cooling system and directly coupled to an output shaft of the air-cooled engine, provides simultaneous high voltage AC and low voltage DC outputs. An enclosure surrounds the air-cooled engine and the air-cooled brushless generator and provides protection and mechanical support. A system of first and second air ducts within the enclosure separately conveys cooling air into and through the air-cooled engine and the brushless generator respectively. The cooling air, drawn into the first and second air ducts by respective direct drive fan devices integrated in the air-cooled engine and in the brushless generator, exits from the enclosure through first and second air outlets.

In another embodiment, there is disclosed a system comprising a compact, AC operated auxiliary heating and air conditioning unit operable in the cab of a transport vehicle powered by an internal combustion engine and an auxiliary power unit (APU) having an air-cooled engine directly coupled to a brushless generator providing simultaneously a high voltage AC output and a low voltage DC output. The APU is operable, when coupled to a fuel supply, exhaust and electrical system of the transport vehicle, to supply the AC voltage to the auxiliary heating and air conditioning unit and to at least one AC branch circuit in the cabin of the transport vehicle, and to supply the DC voltage to the electrical system of the transport vehicle. Control means coupleable with the APU and the auxiliary heating and air conditioning unit controls the distribution of the high voltage AC output and the low voltage DC output of the APU and controls the operation of the auxiliary heating and air conditioning unit. Harness means couples the AC output to the auxiliary heating and air conditioning unit and to the at least one AC branch circuit, the DC output to the electrical system of the transport vehicle, and the control means to the auxiliary heating and air conditioning unit and to the APU.

DETAILED DESCRIPTION OF THE INVENTION

In the following description the term transport vehicle is taken generally to mean a motorized vehicle, such as a truck, ship or airplane, usually driven by a driver or pilot and used for the shipment of goods over long distances. In the disclosed embodiment a transport vehicle is a long-haul, diesel powered truck. This type of vehicle often includes a sleeping compartment in the cabin (cab) of the truck tractor unit. This cab is typically equipped with a heating and air conditioning unit, lighting, electrical outlets and small appliances, all of which are powered by an electric generator driven by the truck's engine or an auxiliary engine. Nevertheless, a transport vehicle could as easily be a boat equipped for the same type of shipping service, or even an aircraft configured for long distance hauling to remote areas, for example.

Figure 1:
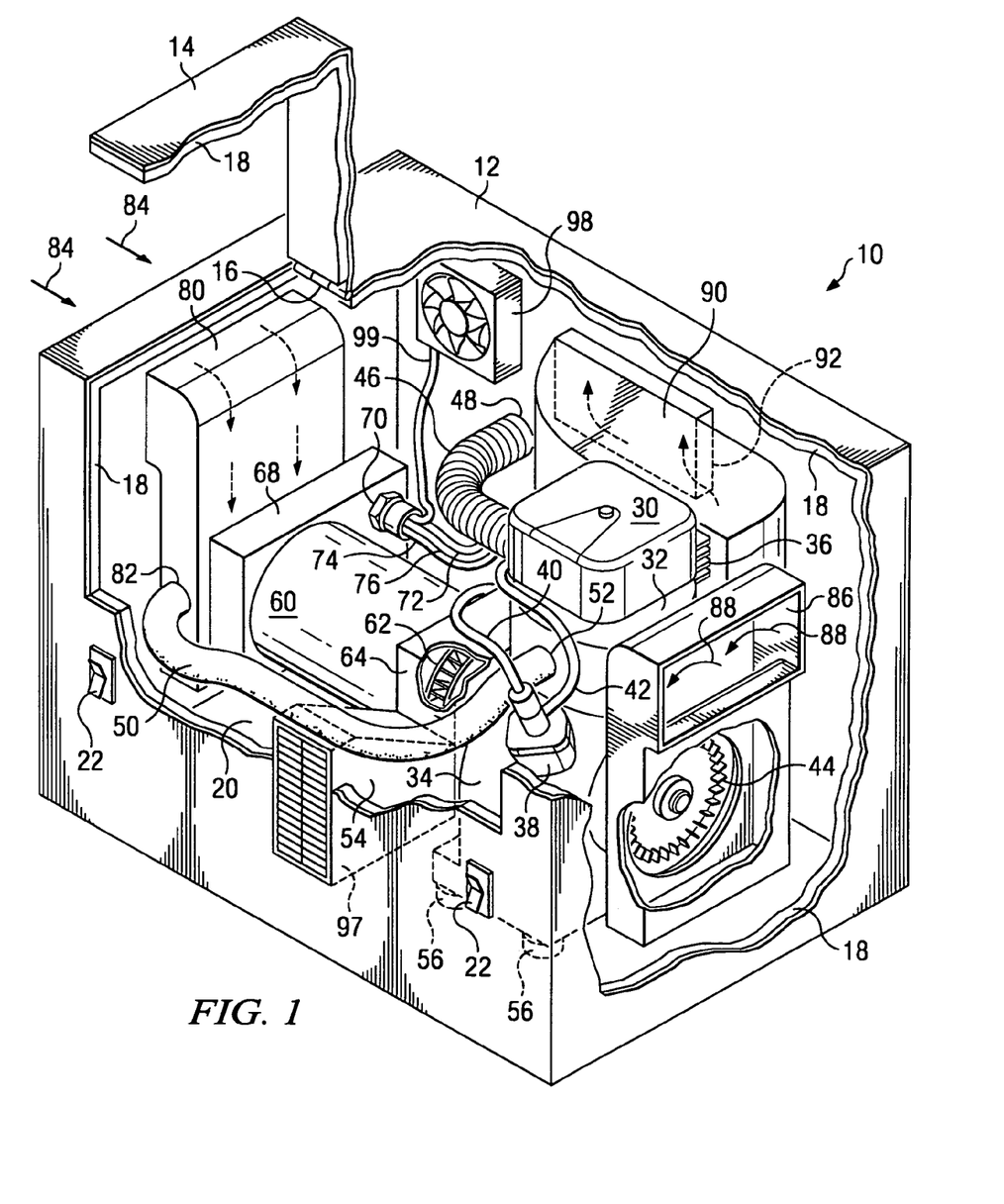
FIG. 1 illustrates an isometric view, partially cutaway, of the front, left corner of one embodiment of an auxiliary power unit (APU) according to the present invention, showing the arrangement of internal components and the paths of cooling air flow through the duct systems.

Referring to FIG. 1, there is illustrated an isometric view, partially cutaway, of the front, left corner of one embodiment of an auxiliary power unit (APU) 10 according to the present invention, from a slightly elevated perspective. Note that the left end of the APU 10 is facing to the right in FIG. 1. The APU 10 is enclosed in an enclosure 12 that includes a hinged cover 14, which pivots about hinge 16 as it is opened. The cover 14 opens to expose the front and upper portions of the interior to enable performing maintenance operations. The enclosure walls may be fabricated out of sheet metal, preferably hardened aluminum plate, such as Tread Brite—3003, to minimize weight. The wall panels are secured to an 'angle iron' frame to form the rectangular-shaped box having dimensions of approximately 26" long×18" wide×19" high. The frame members (not shown) are located at each junction of adjacent wall panels of the enclosure 12. Mounting holes may be positioned in the frame members to support the APU 10 between the frame rails of a transport vehicle or to support the APU against one of the frame rails on the side of the transport vehicle.

The APU 10 of the present invention, because it is entirely air-cooled, and because it employs direct drive between the engine and generator, weighs only approximately 265 pounds. This may be compared with conventional auxiliary power units which are liquid cooled, generally require a converter or an inverter to produce a second voltage output and typically require an adapter that employs a belt, chain, clutch or gear set to couple the engine to the generator. The additional components required in these conventional systems add weight, such that a complete conventional auxiliary power unit often approaches or exceeds a weight of 400 pounds, significantly more than that of the auxiliary power unit according to the present invention. The additional components required in the conventional systems also add complexity, maintenance requirements and cost, all without improving the efficiency. As mentioned previously, efficiency is reduced in any of these conventional auxiliary power units because the motive power supplied by the engine must be large enough to overcome the extra losses associated with the more complex and less efficient conventional auxiliary power units.

Returning now to FIG. 1, the enclosure 12, including the cover 14 is lined on the interior side with a lining 18 on all interior surfaces except the bottom pan 20, and portions of the enclosure 12 where ducts within the enclosure 12 are vented to the exterior of the enclosure 12. The material used for the lining 18 is provided to absorb sound energy generated within the enclosure 12. One material that is suitable is a three-layer, ½ inch thick, mylar-faced sound insulation product called "GSI Sound Stop Foam" available from Great Southern Insulation Corporation, Fort Lauderdale, Fla. 33335. This product contains three layers of synthetic foam of varying densities to absorb sound energies distributed across a range of frequencies. Other types of sound insulation may also be used. The selection depends on such factors as the particular frequencies and intensities of the sound energy generated within the enclosure 12 and the amounts of attenuation or absorption desired.

Continuing with FIG. 1, a pair of latches 22 secure the cover 14 when it is in a closed position. An air-cooled engine 30 is mounted on the bottom pan 20, near one end of the enclosure 12, supported by vibration-absorbing motor mounts 56. The air-cooled engine 30 includes a cylinder head 32 and a crankcase 34. Air-cooled engine 30 is preferably a diesel engine so that it may use the same fuel that most transport vehicles, into which the APU 10 of the present invention is installed, currently use. However, air-cooled engine 30 is not limited to diesel fuel and may be selected to operate on any viable fuel as long as a fuel supply is readily available. In the disclosed embodiment the fuel supply is drawn from the transport vehicle's fuel tank as will be described. The air-cooled engine 30 in the disclosed embodiment is a Model 15 LD 350, 7.5 horsepower (Hp), single cylinder diesel engine manufactured by Lombardini Motori of 42100 Reggio Emilia—Italia—ITALY and available from Lombardini USA, Inc., 2150 Boggs Road, Duluth, Ga. 30096. Although a single cylinder engine is suitable for the illustrative embodiment described herein, there is no necessary limitation to a single cylinder. In some applications the engine of choice may have more than one cylinder and still fall within the scope of the present invention. Further, while the typical internal combustion engine employs a crankshaft from which the output is taken, other engine types, such as a Wankel rotary engine that has an output shaft but not a crankshaft, may be well-suited to the APU of the present disclosure.

A suitable alternative for the air-cooled engine 30 is a Model 15 LD 315, a 6.8 Hp version of the same engine described hereinabove. Other power ratings may be used, the choice being determined by the maximum amount of electrical power to be generated by the APU, which, in the illustrated embodiment is approximately 5.0 KW. In most cases, the particular power ratings of the engine and generator selected are a function of the particular application and the availability of components having the specific ratings needed. In the APU of the present invention, the air-cooled engine 30 develops the 7.5 Hp needed to drive the brushless generator to its full output of 5.0 Kw. Thus, the approximate efficiency may be calculated as: (5.0 Kw/0.746 Kw per Hp)/(7.5 Hp)×100=6.7/7.5×100=89%. As will be described, the key relationship between the power ratings of the engine and the generator used in the APU is the efficiency of the unit. It will be appreciated by those skilled in the art that a rotating machine configured as an electric generator needs only a motive force to rotate the rotating element, e.g., the armature of the generator. Thus, any motive force capable of the required torque, speed, etc. would be suitable.

Figure 4:
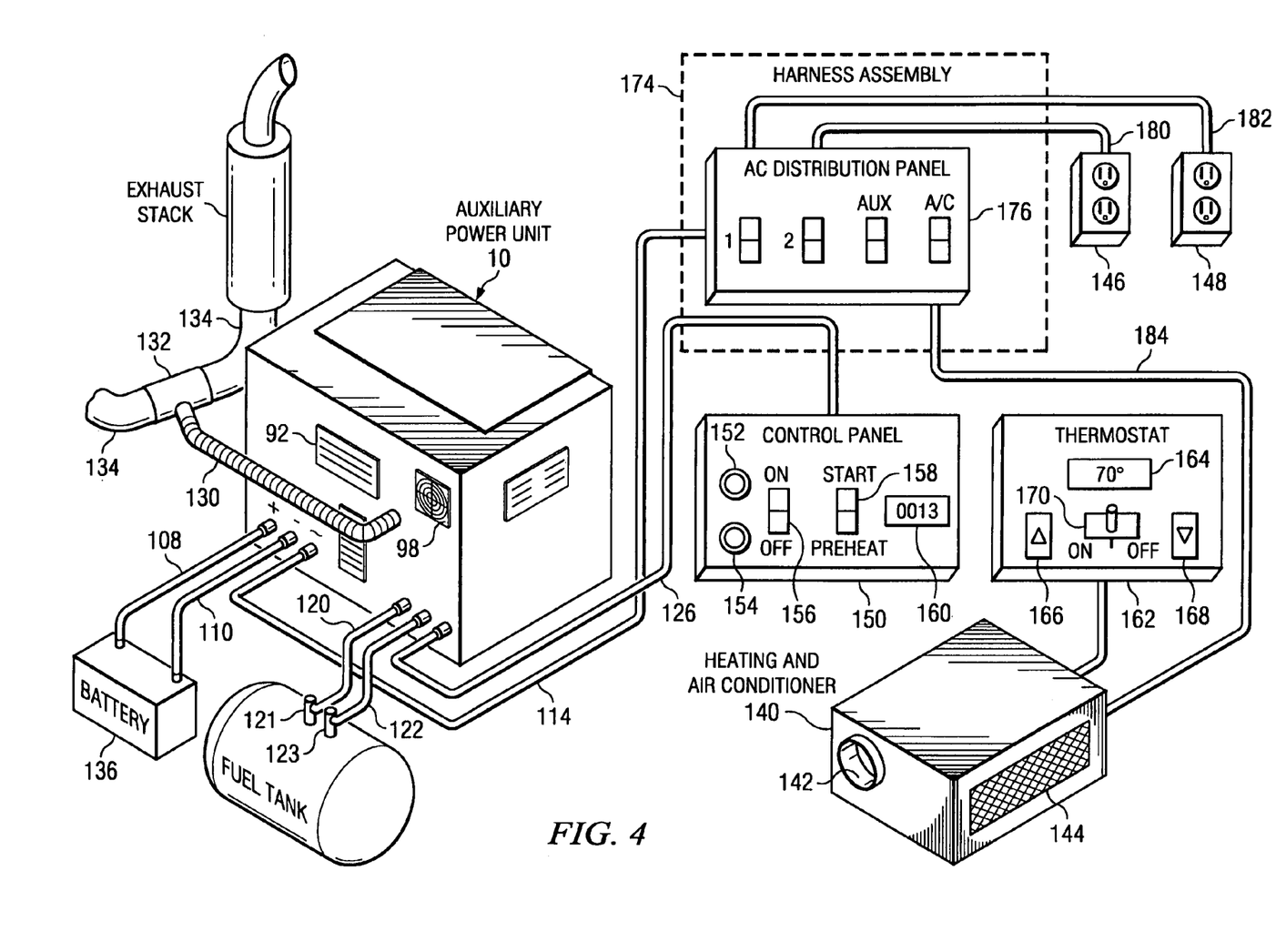
FIG. 4 illustrates a pictorial view of the components of a system application in a transport vehicle including a heating and air conditioning system employing the APU according to the present invention.

Continuing with FIG. 1, the cylinder head 32 of the air-cooled engine 30 includes an array of cooling fins disposed on the exterior of the cylinder head 32. These cooling fins, as is well-known, increase the radiating surface area of the cylinder head 32 to better dissipate the heat produced by the air-cooled engine 30. Disposed on the side of the crankcase 34 of the air-cooled engine 30 is an injector pump 38. Injector pump 38 receives fuel from inlet fuel line 40 and controls the amount of fuel injected into the air-cooled engine 30. The fuel line 40 delivers fuel from the fuel tank (See FIG. 4) of the transport vehicle carrying the APU 10 via a standpipe unit 121 installed in the fuel tank as shown in FIG. 4. An exemplary standpipe unit used in the disclosed embodiment is a Model 903210A manufactured by Webasto, a standard, off-the-shelf item. A return fuel line 42 connects a bypass connection of the injector pump 38 back to a standpipe unit 123 installed in the fuel tank.

The air-cooled engine 30 includes a flywheel 44 configured as a fan. The flywheel fan 44 includes a series of radially-disposed vanes shaped to draw outside air inward toward the flywheel through an opening as the flywheel fan 44 rotates when the engine 30 is running. The opening is generally round, in a housing that surrounds the flywheel fan 44. The air drawn inward by the vanes on the flywheel fan 44 is forced through an internal duct system alongside the engine, and closely past the cooling fins 36, as will be described. The air-cooled engine 30 also includes an exhaust pipe 46, which couples an exhaust port (not shown) on the cylinder head 32 of the air-cooled engine 30 to an exhaust outlet 48 in a wall of the enclosure 12. In the disclosed embodiment of FIG. 1, the exhaust outlet 48 is on a rear wall of the enclosure 12, for coupling to the exhaust system of the transport vehicle as will be described. In the illustrated embodiment, the exhaust pipe is a flexible metal tubing. In some applications, the exhaust pipe may be insulated against the escape of heat or excess sound from the engine exhaust.

An air intake pipe 50 coupled to an air intake port 52 on the air-cooled engine 30 is provided for conducting outside air for combustion into the air-cooled engine 30. The air intake pipe 50 typically passes through an air cleaner filter, which is not shown for clarity purposes. An air cleaner disposed in the air intake of an internal combustion engine is well-known to persons skilled in the art.

Continuing with FIG. 1, an air-cooled, brushless generator 60 is shown directly coupled to the air-cooled engine 30. In the illustrated embodiment the crankshaft of the air-cooled engine 30 and the armature shaft of the brushless generator 60 are directly coupled together such that both shafts are aligned along the same axis. The coupling includes no belt, chain, clutch, or gear set. The advantages of this configuration are compactness, no slippage in the drive mechanism, quieter operation, efficiency, reliability and lower maintenance. However, it will be appreciated that, in some applications, it is possible for the engine 30 and generator 60 to share a common housing. For example, in technology currently in use in automotive applications a hybrid internal combustion engine and electric motor assembly shares a common block, frame or housing. Thus, there is no reason such a hybrid engine/generator architecture would not also be suitable for the APU of the present disclosure.

The air-cooled brushless generator 60 selected for the APU of the present invention is chosen because of its high efficiency and the capability of providing both high voltage AC and low voltage DC outputs simultaneously and directly. This design has the advantages of simplicity, reliability, efficiency, light weight and low maintenance. The air-cooled brushless generator shown in the illustrative embodiment is a 5.0 Kilowatt (KW) unit supplied by BMZ Generators, Inc., 412 N. Federal Highway, Pompano Beach, FL 33062. The AC output is rated at 120 VAC @ 40 Amperes and the DC output is rated at 12 VDC @ 50 Amperes. A variety of other output ratings are available as well as AC outputs having different voltages, single phase or multi-phase, or a choice of 50 Hz or 60 Hz, or in combination with DC voltages at various levels.

The brushless generator 60 is supplied in a cylindrical housing with an air chamber or plenum at each end of the generator 60. An exit fan 62, within an exit plenum 64 at the driven end of the armature shaft next to the air-cooled engine 30, exhausts air warmed within the brushless generator 60, through a series of slots in the sides of the exit plenum 64. The air from the front-oriented side of the exit plenum 64 then travels through a forward air duct 54 and an oil cooler 97 to exit to the outside of the enclosure 12. The air from the rear-oriented side of the exit plenum 64 then travels through a corresponding air duct (shown in FIG. 2 and to be described) to exit to the outside of the enclosure. The exit fan 62 draws cooler outside air into the brushless generator 60 through an inlet air duct 80. The cooler inlet air is directed through the brushless generator 60 where it absorbs heat produced in the generator and conveys it toward the exit fan 62 located in the exit plenum 64.

Continuing with FIG. 1, mounted on an upper corner of the entry plenum 68 is a generator output connector 70. Output connector 70 connects wiring to conduct the AC and DC output voltages from the generator output to a terminal on the rear side of the enclosure 12 (See FIG. 2). The wiring includes a pair of wires 72 supplying the AC voltage to a connector assembly on the rear panel and a pair of wires 74, 76 to supply the positive and negative respective polarities of the DC output voltage to corresponding terminals on the rear panel.

The enclosure 12, described hereinabove, though it resembles a simple box, presented a challenge in the design of the APU of the present disclosure because it must serve a number of purposes. In addition to providing protection from the weather and road debris and moisture, and providing convenient means for mechanical support on the transport vehicle, the enclosure 12 is relied upon to contain the sound generated within the enclosure by the air-cooled engine and the air-cooled, brushless generator. The sound is partly contained by the enclosure walls and partly absorbed by the sound insulation that lines the interior of the enclosure 12. Efforts, including experimentation, to solve the remaining problem, of removing the heat from within the enclosure 12, led to the configuration of the components of the APU shown in the illustrated embodiment. Accordingly, the enclosure 12 includes a system of air ducts to direct and control the flow of air into and through the air-cooled engine 30, the air-cooled, brushless generator 60 and the enclosure 12.

As shown in FIG. 1, an air inlet duct 80, having essentially a wide, low profile, rectangular cross-section, provides an enclosed passage for cool, outside air to enter the entry plenum 68 at the air inlet end of the brushless generator 60. The outside air 84, drawn by the exit fan 62, enters an air inlet vent (not shown) on the right side of the enclosure 12, travels downward through the duct 80 into the entry plenum 68. The air travels through the generator housing, picking up heat radiated by the internal structures of the brushless generator 60 and is drawn out through the vents in the sides of the exit plenum 64. The warmed air from the brushless generator 60 is forced away from the exit plenum 64, by the blades of the exit fan 62 within the plenum 64, and through the forward air duct 54 and oil cooler 98 and the rearward air outlet duct (See reference number 100 in FIG. 2) to the outside of the enclosure 12. This generator duct system thus removes heat produced by the brushless generator 60, confines it to the duct system and prevents it from contributing to the build-up of heat within the enclosure 12. To enhance the heat-confining capability of the generator duct system, the ducts 80, 54, and 100 may be covered with thermal insulating material.

Figure 2:
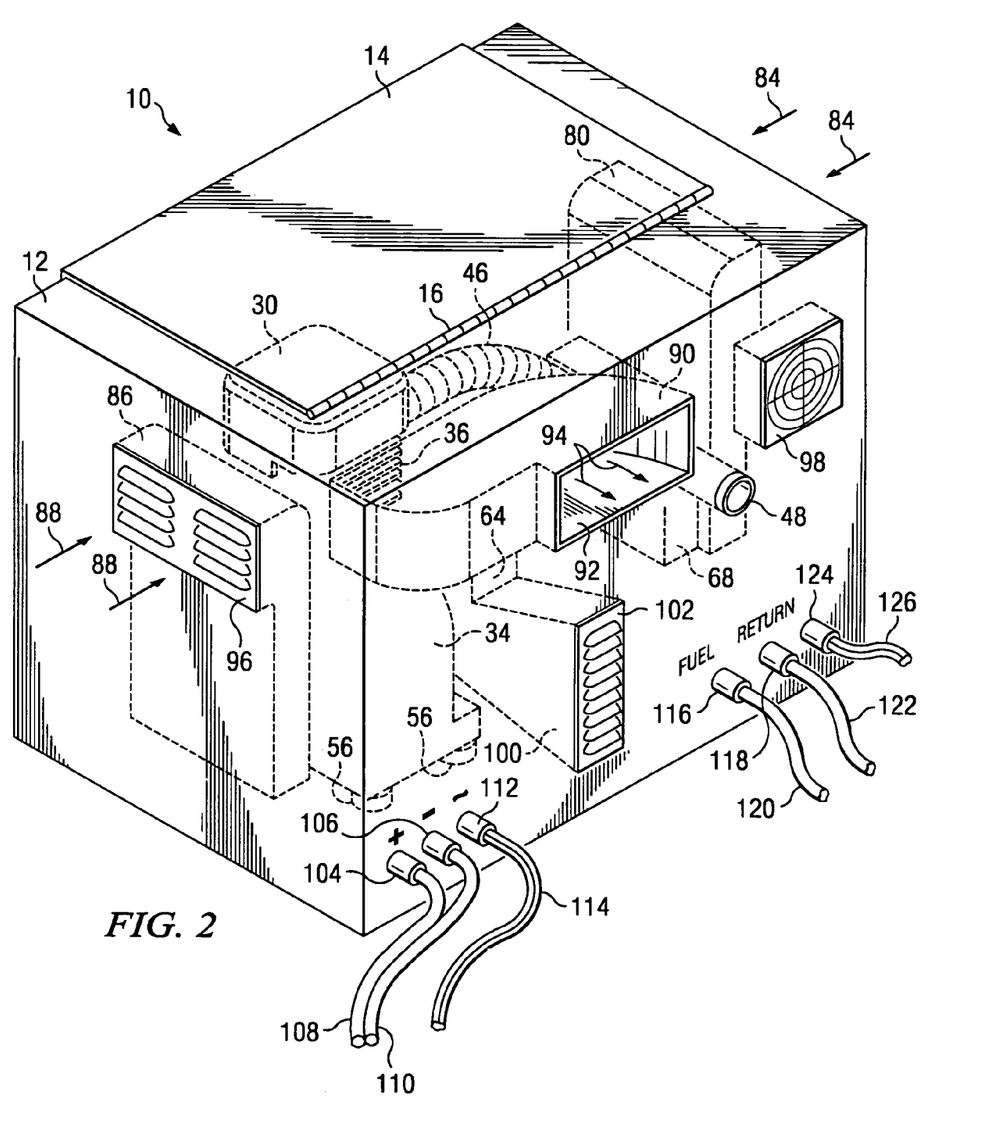
FIG. 2 illustrates an isometric view of the rear, left corner of the embodiment of the auxiliary power unit (APU) shown in FIG. 1.

Also shown in FIG. 1 is an air inlet duct 86, having essentially a wide, low profile, rectangular cross-section that provides an enclosed passage for cool, outside air to enter the housing containing the flywheel fan 44 at the air inlet end of the air-cooled engine 30. The outside air 88 enters an air inlet vent (See FIG. 1) on the left side of the enclosure 12, travels downward through the duct 86 into the flywheel housing. There, the blades of the flywheel fan 44 gather the air as the flywheel fan 44 rotates, drawing the inlet air into the flywheel housing of the air-cooled engine 30. The air travels through the engine structure around the cylinder head 32 and past the cylinder head cooling fins 36, picking up heat radiated therefrom and is forced into an engine outlet duct 90, through which it travels to an engine air outlet vent 92. In the illustrated embodiment of the APU 10 the engine air outlet vent 92 is located on a rear panel of the enclosure 12 as shown in FIG. 2. In some applications, it may be advantageous to install an exhaust fan (not shown), which may be thermostatically controlled, in the engine air outlet vent 92 to pull more air through the engine air duct system under heavy loads during periods of very high outside temperatures. The warmed air from the air-cooled engine 30 is forced through the engine by the blades of the flywheel fan 44 within the flywheel housing of the air-cooled engine 30, and through the engine air outlet duct 92 to the outside of the enclosure 12. This engine duct system thus removes heat produced by the air-cooled engine 30, confines it to the duct system and prevents it from contributing to the build-up of heat within the enclosure 12. To enhance the heat-confining capability of the engine duct system, the ducts 86 and 90 may be covered with thermal insulating material.

Continuing with FIG. 1, an exhaust fan 98 is shown installed on a wall panel of the enclosure 12. Exhaust fan 98 is provided to remove residual hot air from the enclosure 12. Air inlet vents (not shown) may be strategically placed in or near the floor or bottom pan 20 of the enclosure 12 to facilitate air flow produced by the exhaust fan 98. Exhaust fan 98 may also be thermostatically controlled or controlled by a central control system (not shown) located, for example, in the cab of the transport vehicle. The Exhaust fan 98 may be AC or DC powered, with the electric current provided by exhaust fan wires 99. The selection of the fan specification is based on the amount of air, in cubic feet per minute (CFM), that must be moved through the respective duct system to maintain temperatures within acceptable ranges for the particular device involved. Very often the correct specification is determined after laboratory and field testing under actual conditions. Heretofore, field tests of the APU disclosed herein on several long-haul trucks have demonstrated the feasibility of the design described herein.

Referring to FIG. 2, many of the structures to be identified in FIG. 2 are the same as—and bear the same reference numbers as—the structures shown and described in FIG. 1. In FIG. 2 there is illustrated an isometric view of the rear, left corner of the embodiment of the auxiliary power unit (APU) 10 shown in FIG. 1, showing internal components in phantom lines and the components of the rear wall 21 of the enclosure 12. The enclosure 12 is shown with the cover 14 in a closed position. The cover 14 is attached to the enclosure 12 along a hinge 16. Visible within the enclosure 12 are the air-cooled engine 30, having a crankcase 34 and cylinder head cooling fins 36, mounted on motor mounts 56 on the bottom pan 20. The engine exhaust pipe 46 is shown, as is the exhaust pipe coupling 48 mounted on the rear wall 21 of the enclosure 12. The exit plenum 64 and the entry plenum 68 for the generator 60 are shown, as are the generator air inlet duct 80 and the rearward air outlet duct 100 coupled to a louvered generator air outlet vent 102. Further, there is shown in FIG. 2 the engine air inlet duct 86, which conveys outside air 88 that enters through the louvered panel 96 toward the air-cooled engine flywheel fan 44 as previously described. The warmed air 94 from the air-cooled engine 30, forced through the engine by the blades of the flywheel fan 44 within the flywheel housing of the air-cooled engine 30, is forced through the engine air outlet duct 90 to vent at the air outlet 92 to the outside of the enclosure 12. The fan 98, for venting residual warm air from the enclosure 12, is shown mounted in the upper, right portion of the rear wall 21 of the enclosure 12.

Continuing with FIG. 2, various connections of lines, tubes and wires that communicate with the APU 10 of the present disclosure are shown mounted on the rear wall 21 of the enclosure 12. Beginning at the lower left corner of the rear wall of the enclosure 12 in the figure, a positive terminal 104 and a negative terminal 106 for coupling the DC voltage output via respective positive lead 108 and negative lead 110 from the APU to the electrical system of the transport vehicle, generally at the battery, are shown. See, e.g., FIG. 4. Next to the negative terminal 106 is an AC terminal 112 coupled to AC leads 114. The AC leads 114, which supply power to the cabin of the transport vehicle, are routed to a control box in the cabin of the transport vehicle as will be described hereinbelow during the description of FIG. 4. At the lower right corner of the APU shown in FIG. 2 is a control terminal 124 for coupling a control cable 126 between the APU 10 and the cabin of the transport vehicle. To the left of the control terminal 124 are a pair of fuel line fittings. Inlet fuel fitting 116 receives fuel from the fuel tank of the transport vehicle via a fuel line 120 connected to a standpipe unit installed in the fuel tank. Outlet or return fuel fitting 118 returns bypassed fuel to the fuel tank of the transport vehicle via a fuel line 122 and a standpipe 123. Further details of the lines, tubes and wires that communicate between the APU 10 and the cabin of the transport vehicle or the electrical or exhaust systems of the transport vehicle will be described hereinbelow.

Figure 3:
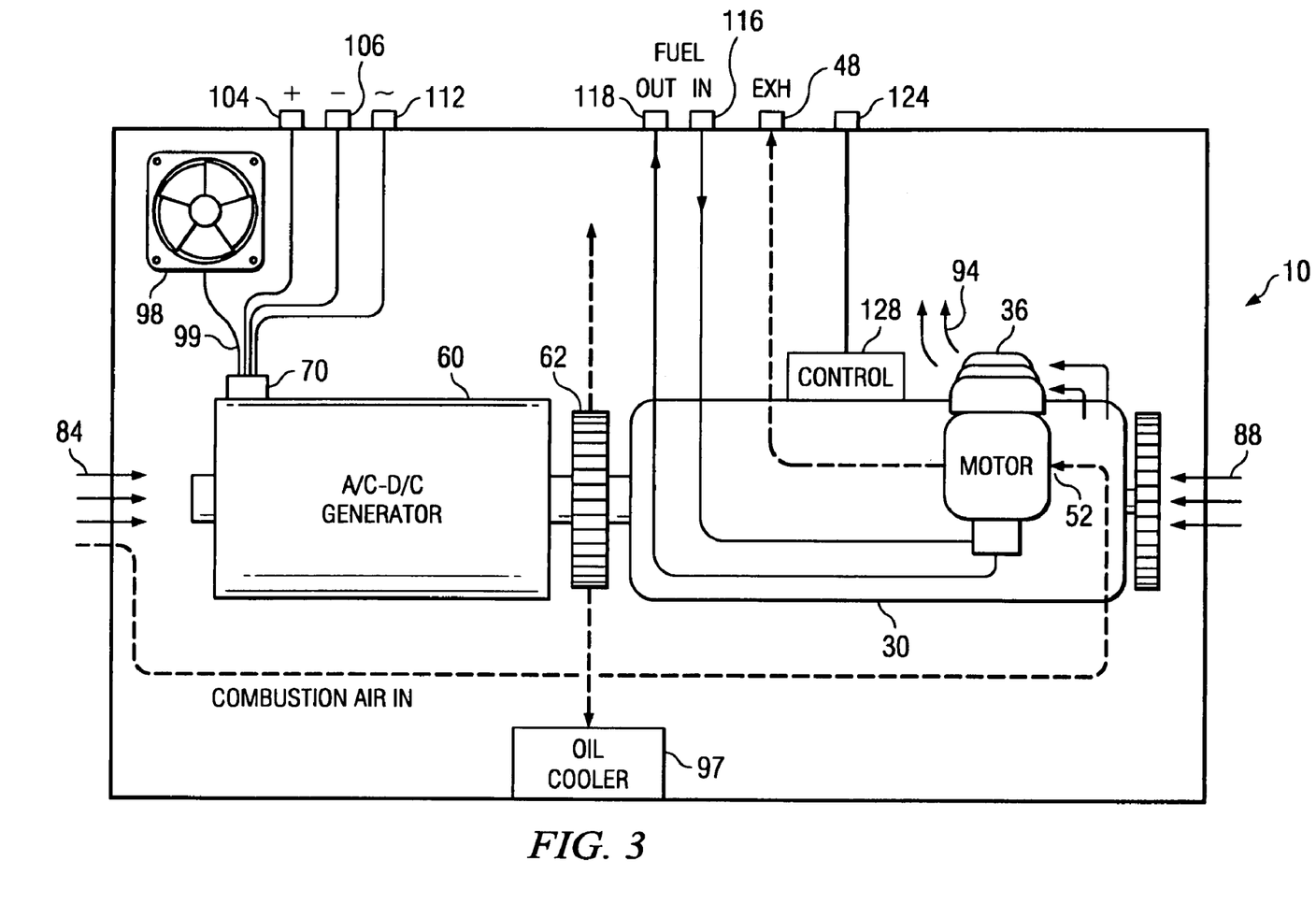
FIG. 3 illustrates a simplified block diagram of air flow paths and of the electrical wiring of various components of the embodiment illustrated in FIGS. 1 and 2.

Referring to FIG. 3, there is illustrated a simplified block diagram of air flow paths and of the electrical wiring of the various components of the embodiment illustrated in FIGS. 1 and 2. An outline of a plan view of the auxiliary power unit 10 encloses outlines of the air-cooled engine 30 coupled to the brushless generator 60, the oil cooler 97 and the exhaust fan 98. The air-cooled engine 30 includes the cylinder head cooling fins 36 and the flywheel fan 44 described previously. The brushless generator 60 includes an air exit fan 62 and an output connector 70, also described previously. The paths representing the flow of outside air 84 into the brushless generator 60 and outside air 88 into the air-cooled engine 30 are shown as solid arrows pointing inward toward the air entry plenum 68 and the flywheel fan 44 respectively. Air outlet from the brushless generator 60 follows the dashed line paths leading away from the air exit fan 62, with one path passing through the oil cooler 97. The air outlet path 94 from the air-cooled engine 30, after passing through the cylinder head cooling fins 36, follows the solid arrows 94 en route to exiting the enclosure of the APU 10. A combustion air intake path, which enters with the incoming outside air 84, diverges along a separate, dashed line path toward the air-cooled engine. As explained previously, the combustion air flows through an air intake pipe 50 to the air-cooled engine air intake port 52.

Continuing with FIG. 3, wire leads from the output connector 70 include exhaust fan wires 99, the output lead to positive DC output terminal 104, the output lead to negative output terminal 106 and the output leads to the AC output terminal 112. Fuel lines are shown in FIG. 3, including an inlet line from the fuel inlet fitting 116 and a return line to the fuel return fitting 118. The air-cooled engine exhaust pipe 46, represented by a dashed line, connects to the exhaust pipe coupling 48. Wiring from a control panel, located inside the cabin of the transport vehicle as will be described, connects to control terminal 124. From the control terminal 124, wiring connects the control terminal 124 to a control unit 128. Control unit 128, attached to the air-cooled engine 30, or coupled to it by a short cable 129, may be used to facilitate preheating, starting, and running the air-cooled engine 30 during operation of the APU 10 of the present invention.

Referring to FIG. 4, there is illustrated a pictorial view of the components of a system application in a diesel powered transport vehicle of a heating and air conditioning system employing the APU 10 according to the present invention. Engine exhaust from the air-cooled engine 30 is routed through an outside exhaust tubing 130 to an adapter tap 132 inserted in-line with an exhaust stack 134 of the transport vehicle (not shown). In one embodiment, the adapter tap 132 is inserted in the flex joint of an exhaust pipe 134. The outside exhaust tubing 130 may be a gas-tight flexible metal tubing material, e.g., a corrugated stainless steel tubing, for ease of installation and the capability to isolate harmonic vibrations traveling in either direction along the outside exhaust tubing 130. Other connections to the APU 10 include the storage battery 136 of the transport vehicle, which is connected via a positive DC output lead 108 and a negative DC output lead 110 to the APU 10. AC leads 114 connect the APU 10 to a distribution panel 172. The control cable 126 connects the APU 10 to a control panel 150. Inlet fuel line 120 and return fuel line 122 connect the respective fittings on the APU 10 with the fuel tank 138 of the transport vehicle via respective standpipe fittings 121, 123.

Inside the cabin of the transport vehicle, typically under the bunk bed or other convenient location, is installed a self-contained, 110 volt heating and air conditioning (H-A/C) unit 140. A suitable H-A/C unit 140 is Part No. 090-00456 available from SCS/Frigette Corporation, Fort Worth, Tex. 76140. This unit provides 9,000 BTUs of air conditioning and approximately 1,500 watts of electric heating. The H-A/C unit 140 includes several outlets such as air outlet 142 shown in FIG. 4, for connecting to air vents (not shown) within the cabin of the transport vehicle and a return air inlet 144. Also inside the cabin of the transport vehicle is a control panel 150 that includes a green lamp 152 to indicate when the air-cooled engine 30 of the APU 10 is running and an orange lamp 154 to indicate when it is time to change the filter in the H-A/C unit 140. The control panel 150 further includes an ON/OFF switch 156 for the engine ignition, a PREHEAT/START switch 158 for starting the air-cooled engine 30, and an hour meter 160 to log the hours of operation. The control panel 150 is coupled to the APU 10 via control leads 126.

Another unit inside the cabin of the transport vehicle is a thermostat 162, connected to the H-A/C unit 140 via wires 172, for controlling the operation of the H-A/C unit 140. The thermostat 162, which is a standard item typically shipped with the H-A/C unit 140, includes a display to indicate the temperature of the cabin and a preset temperature setting. The thermostat may also include switches 166, 168 for adjusting the temperature setting up or down, respectively. A switch 170 provides ON/OFF control of the H-A/C unit 140. The cabin may also be equipped with first and second AC outlet boxes 146, 148.

The APU 10, the H-A/C unit 140 and the control panel 150 are electrically connected together via a harness assembly 174 shown within the dashed line in FIG. 4. The harness assembly 174 may include all wiring routed to an AC distribution panel 176 and the control lines between the APU 10 and the control panel 150. The harness assembly 174 may include various connectors (not shown) and wiring installation accessories (not shown) for adapting to the particular installation. The AC distribution panel 176 includes circuit breakers for controlling delivery of AC power to the H-A/C unit 140 via wires 184, to the AC outlet boxes 146, 148 via wires 180, 182 respectively and to an auxiliary circuit to other devices on the transport vehicle, such as an engine preheater (not shown) for example. The switches in the AC distribution panel may include, or be incorporated into, circuit breakers with ratings suitable for the intended electrical loads.

Figure 5A:
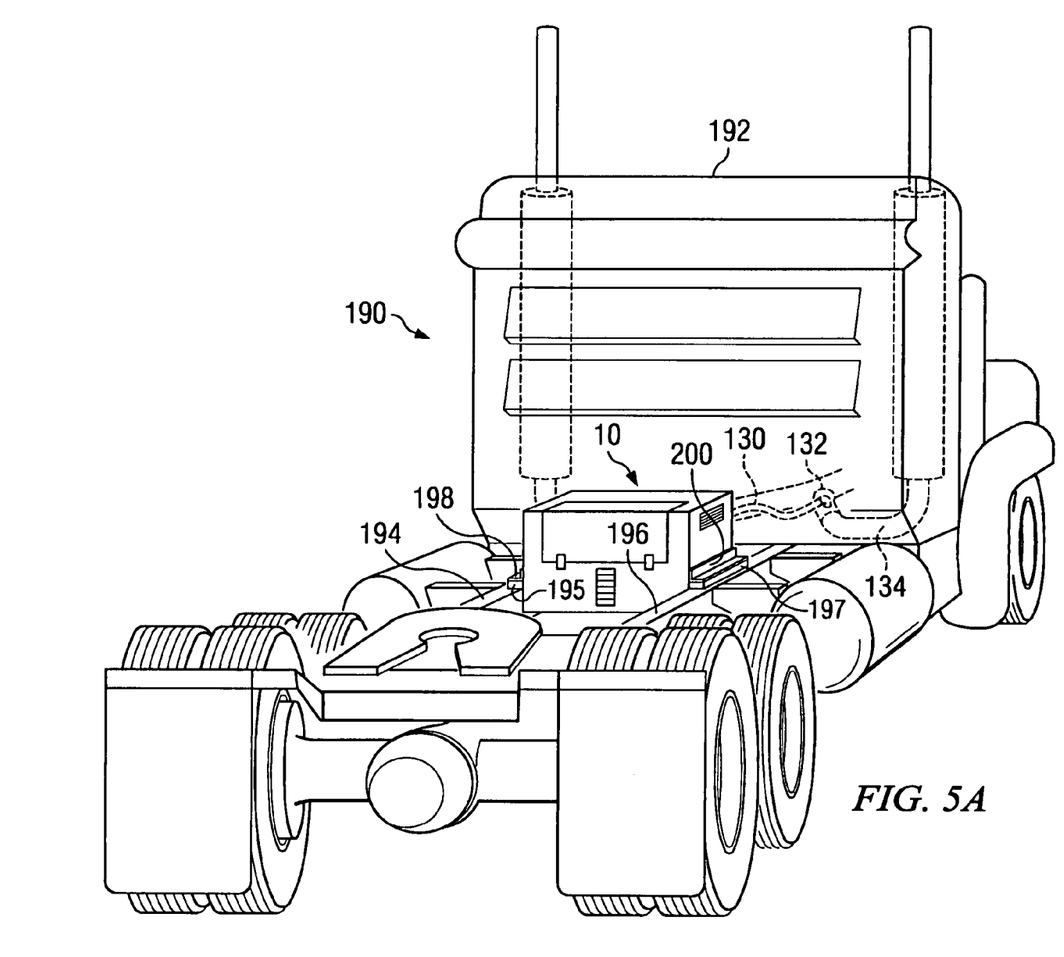
FIG. 5A illustrates a pictorial view of the rear of a truck tractor having an APU according to the present invention installed between the frame rails of the truck.

Referring to FIG. 5A, there is illustrated a pictorial view of the rear of a truck tractor 190 having a cabin 192 and an APU 10 according to the present invention installed between the frame rails 194, 196 of the truck 190. The APU 10 is supported by angle brackets 198, 200 bolted to the enclosure 12 of the APU 10 and the frame rails 194, 196 respectively. In a preferred embodiment, the angle brackets 198, 200 are isolated from the frame rails 194, 196 by vibration-absorbing pads 195, 197. A suitable material for the vibration-absorbing pads is neoprene rubber, one-half inch thick. In the illustrative embodiment, the vibration-absorbing pads are approximately 2-½ inches wide and 22 inches long. However, the thickness of the neoprene pads, and the durometer thereof may be predetermined according to the results of experiment and characteristics of the particular application. In another embodiment, the APU of the present invention may be supported on the transport vehicle using a clamping assembly. A clamping mounting assembly enables the mounting and installation of the APU on the transport vehicle without requiring drilling or welding operations.

In one example of the clamping assembly, L-shaped angle brackets 198, 200, approximately 22 inches long and bolted to the enclosure 12 of the APU 10 along the vertical side of the angle brackets 98, 200, extend approximately two inches fore and aft beyond the front and rear walls, on each side of the enclosure 12. The horizontal sides of the L-shaped angle brackets 198, 200 which extend laterally away from the sides of the enclosure 12, rest on the top of the frame rails 194, 196. Inverted U-bolts, and spacer bars (not shown) drilled to fit over the threaded ends of the U-bolts, may be used to clamp the ends of the L-shaped angle brackets 198, 200 to the frames rails 194, 196 respectively. To absorb vibration, neoprene pads 195, 197 may be installed between the L-shaped angle brackets 198, 200 and the upper side of the frame rails 194, 196 and also between the spacer bars (not shown) and the lower side of the frame rails 194, 196. The APU 10 may thus be supported between the frame rails 194, 196 as shown in FIG. 5A.

Figure 5B:
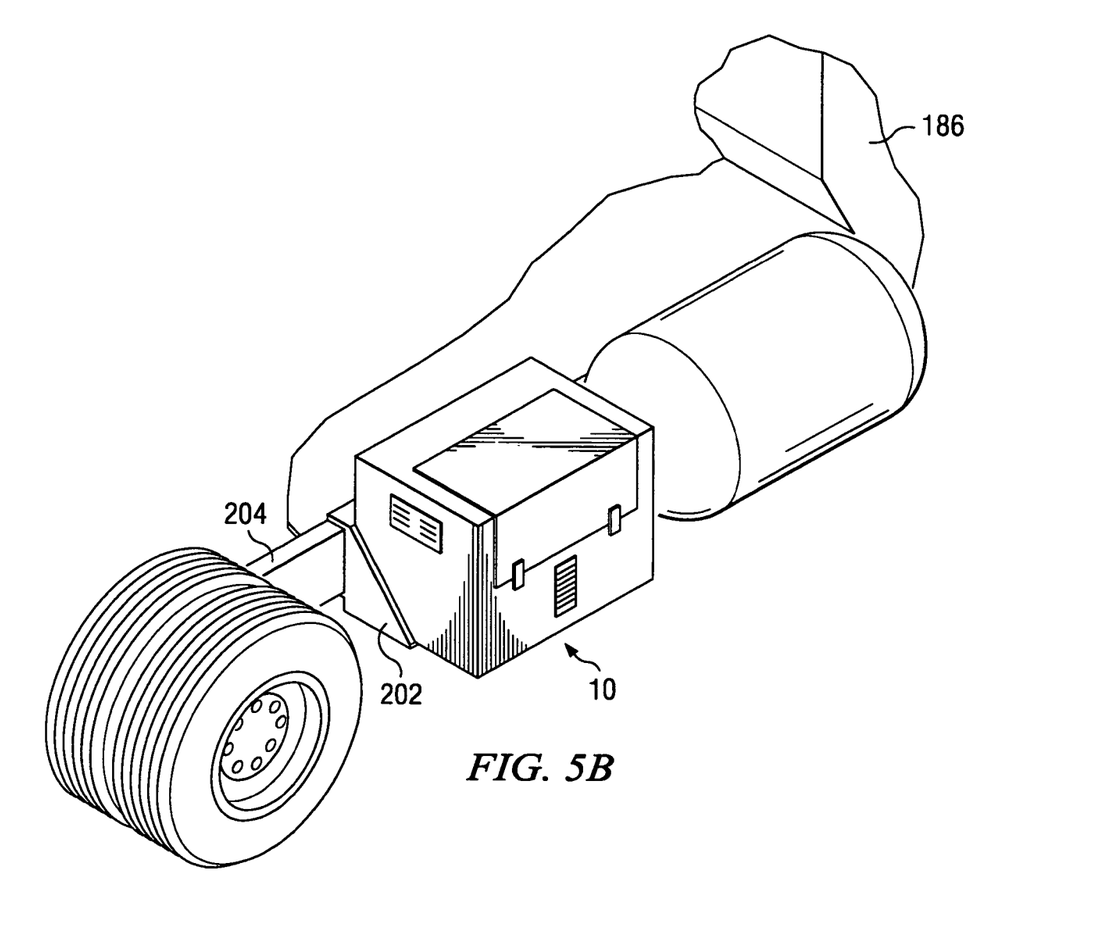
FIG. 5B illustrates a pictorial view of the right side of a truck tractor having an APU according to the present invention installed on the side of a frame rail of the truck.

Also shown in FIG. 5A, in phantom lines, is the connection of the exhaust pipe 130 from the APU 10 to the exhaust pipe 134 of the truck 190 using the adapter 132 as previously described. In FIG. 5B, there is illustrated a pictorial view of the right side of a truck tractor as in FIG. 5A having an APU 10 according to the present invention installed on the side of the truck 192 and supported by a support bracket 202 attached to the frame 204 of the truck 192. The support bracket 202 may be isolated from the frame 204 by vibration-absorbing pads installed therebetween or by vibration-absorbing mounts attached to the bottom of the enclosure 12.

To summarize, there is disclosed hereinabove an auxiliary power unit (APU) for a transport vehicle powered by an internal combustion engine. An enclosure houses and supports the APU on the transport vehicle. An air-cooled engine within the enclosure directly drives an air-cooled, brushless generator. The generator provides direct, simultaneous AC and DC voltage outputs. Air duct systems within the enclosure separately convey cooling air into, through and out of the air-cooled engine and generator. The cooling air, drawn into the air duct systems by respective direct drive fan means integrated in the air-cooled engine and generator, exits through respective air outlet ducts from the enclosure. In another embodiment, a system is disclosed comprising a compact, AC operated auxiliary heating and air conditioning unit operable in the cabin of a transport vehicle and powered by the APU described above. The system may include control means coupled to the auxiliary heating and air conditioning unit and the APU, and harness means for coupling the auxiliary heating and air conditioning unit, the APU, and the control means together.

While the invention has been shown in only one of its forms, it is not thus limited but is susceptible to various changes and modifications without departing from the spirit thereof. For example, as discussed hereinabove, various types of air-cooled internal combustion engines or various types of air-cooled generators may be used in the disclosed APU. Similarly, the air duct systems may be modified in various ways, with or without fan-assisted air movement, to manage the air flow through the engine and generator. The enclosure configuration may likewise be modified to accommodate the modifications to the internal components and systems made to satisfy particular applications. Persons skilled in the art will realize that various modifications may be made to the location of wiring terminals, air inlets and outlets, covers or access panels, mounting structures, fuel supply and exhaust connections, lines or conduits, as illustrative examples, yet remain within the scope of the invention as claimed. Further, the choice of materials used in the enclosure and other elements of the structure, for example, may be made without departing from the scope of the invention as claimed.

What is claimed is:

1. An auxiliary power unit (APU) for a transport vehicle powered by an internal combustion engine, comprising:
    an enclosure for housing and supporting the auxiliary power unit on the transport vehicle;
    an air-cooled engine having an output shaft and enclosed within the enclosure with and directly driving an air-cooled, brushless generator having an armature shalt wherein the air-cooled engine utilizes fuel supply, exhaust and electrical systems of the transport vehicle engine and the generator provides direct, simultaneous AC and DC voltage outputs; and
    first and second air duct systems within the enclosure for separately conveying cooling air into and through the air-cooled engine and the generator respectively, to exit through first and second respective air outlet ducts from the enclosure, wherein cooling inlet air is drawn into the first and second air duct systems by respective direct drive fan means integrated respectively in the air-cooled engine and in the generator;
    wherein the enclosure comprises a frame and a plurality of rigid panels secured to the frame, wherein at least a first one of the plurality of rigid panels includes at least a first opening into a first inlet duct to the air-cooled engine; at least a second one of the plurality of rigid panels includes at least a second opening into a second inlet duct to the generator; and at least a third one of the plurality of rigid panels includes at least a first air outlet opening from a first outlet duct from the air-cooled engine and at least a second air outlet opening from a second outlet duct from the generator.

2. The APU of claim 1, wherein the air-cooled engine directly driving the brushless generator includes a direct coupling such that the output shaft of the air-cooled engine and the generator armature shaft rotate together.

3. The APU of claim 1, wherein the air-cooled engine directly driving the brushless generator includes a direct coupling without the use of a belt, a chain, a clutch or a gear set.

4. The APU of claim 1, wherein at least a first one of the plurality of rigid panels includes at least one air inlet opening and at least a second one of the plurality of rigid panels includes at least one air outlet opening.

5. The APU of claim 4, wherein at least the first air outlet opening includes a fan for exhausting air therefrom.

6. The APU of claim 1, wherein the air-cooled engine includes a fan integrated with the output shaft for drawing air into a first air passage proximate heat radiating portions of the engine.

7. The APU of claim 6, wherein air drawn into the first air passage and heated therein exits via the first air outlet duct.

8. The APU of claim 1, wherein the air cooled brushless generator includes at least one fan integrated with the armature shaft for drawing air into a second air passage proximate heat radiating portions of the generator.

9. The APU of claim 8, wherein the air drawn into the second air passage and heated therein exits via the second air outlet duct.

10. The APU of claim 1, wherein the air-cooled engine is a diesel engine.

11. The APU of claim 1, wherein the air-cooled engine is a single cylinder engine.

12. A high efficiency auxiliary power unit, for a transport vehicle powered by an internal combustion engine and having a fuel system, an engine exhaust system and a battery powered electrical system, comprising:
- an air-cooled engine configured for operation using the fuel supply and the engine exhaust system of the transport vehicle, and having an integral, forced-air cooling system;
- an air-cooled, brushless generator directly coupled to an output shaft of the air-cooled engine and providing simultaneous high voltage AC and low voltage DC outputs and having an integral, forced-air cooling system;
- an enclosure surrounding the air-cooled engine and the air-cooled brushless generator, for protection and mechanical support; and
- a system of first and second air ducts within the enclosure to separately convey cooling air into and through the aft-cooled engine and the brushless generator respectively, to exit through first and second respective air outlets from the enclosure, wherein cooling inlet air is drawn into the first and second air ducts by respective direct drive fan means integrated respectively in the air-cooled engine and in the brushless generator;
- wherein the enclosure comprises a frame and a plurality of rigid panels secured to the frame, wherein at least a first one of the plurality of rigid panels includes at least a first opening into the first air duct to the air-cooled engine, at least a second one of the plurality of rigid panels includes at least a second opening into the second airduct to the brushless generator; and at least a third one of the plurality of rigid panels includes at least a first air outlet opening into the first outlet duct from the air-cooled engine and at least a second outlet opening into the second outlet duct from the brushless generator.

13. The APU of claim 12, wherein the direct coupling of the brushless generator to the output shaft of the air-cooled engine includes a direct coupling such that the output shaft of the air-cooled engine and the armature shaft of the generator rotate together.

14. The APU of claim 12, wherein the direct coupling of the brushless generator to the output shaft of the air-cooled engine includes a direct coupling without the use of a belt, a chain, a clutch or a gear set.

15. The APU of claim 12, wherein the air-cooled engine includes a fan integrated into a flywheel coupled to the output shall of the air-cooled engine for drawing air into a first air passage proximate heat radiating portions of the air-cooled engine.

16. The APU of claim 15, wherein air drawn into the first air passage and heated therein exits via the first air outlet of the system of first and second air ducts.

17. The APU of claim 12, wherein the air-cooled brushless generator includes at least one fan integrated with the armature shaft for drawing air into a second air passage proximate heat radiating portions of the generator.

18. The APU of claim 17, wherein the air drawn into the second air passage and heated therein exits via the second air outlet of the system of first and second air ducts.

19. The APU of claim 12, wherein at least a first one of the plurality of rigid panels includes at least one air inlet opening into at least one of the first and second air ducts and at least a second one of the plurality of rigid panels includes at least one air outlet opening from at least one of the first and second air ducts.

20. The APU of claim 19, wherein at least the first air outlet opening includes a fan for exhausting air therefrom.

21. The APU of claim 12, wherein the air-cooled engine is a diesel engine.

22. The APU of claim 12, wherein the air-cooled engine is a single cylinder engine.

23. The APU of claim 1, wherein the enclosure further comprises a lining of sound absorbing material.

24. The APU of claim 23, wherein the sound absorbing material comprises a multilayer configuration of synthetic materials having different densities.

25. The APU of claim 1, wherein the enclosure is supported on a frame member of the transport vehicle by a clamping assembly.

26. The APU of claim 25, wherein the clamping assembly comprises a clamping device for supporting the enclosure without requiring drilling or welding to complete an installation.

27. The APU of claim 26, wherein the clamping device comprises U-bolt clamps and vibration-absorbing isolation pads.

28. The APU of claim 27, wherein the clamping assembly is adjustable to adapt to different installations.

29. The APU of claim 1, wherein the enclosure is supported on a frame member of the transport vehicle by a plurality of vibration-absorbing devices.

30. The APU of claim 29, wherein a vibration-absorbing device comprises a neoprene pad of predetermined thickness and durometer.

31. The APU of claim 1, wherein engine exhaust from the air-cooled engine is directly coupled via an adapter installed in-line with an exhaust pipe of the transport vehicle upstream of the muffler of the transport vehicle.

32. The APU of claim 31, wherein the adapter includes an inlet pipe formed of corrugated tubing to absorb harmonic vibrations traveling in either direction along the inlet pipe.

* * * * *